Dec. 1, 1959          D. M. WARD          2,915,040

BIRDHOUSE FOR MARTINS

Filed Feb. 11, 1958          7 Sheets-Sheet 1

INVENTOR

Dallas Mitchell Ward

Dec. 1, 1959          D. M. WARD          2,915,040
BIRDHOUSE FOR MARTINS
Filed Feb. 11, 1958                        7 Sheets-Sheet 2
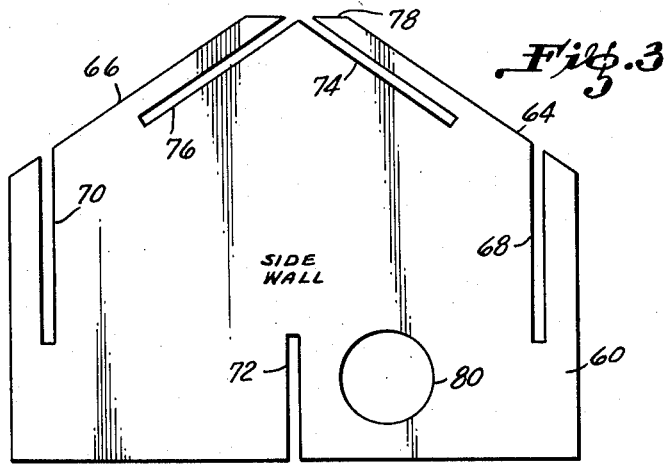
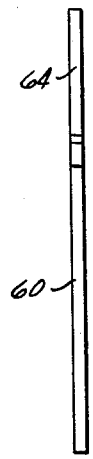
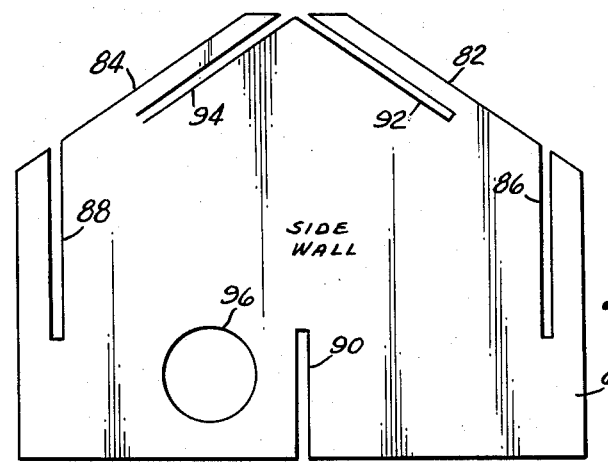
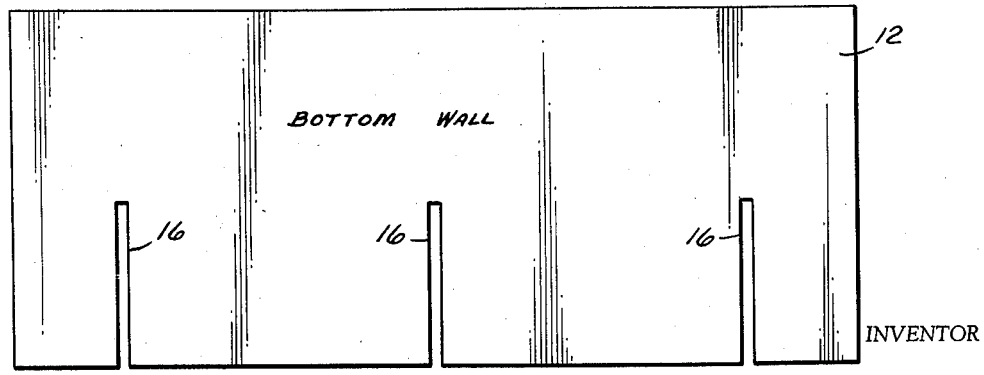
INVENTOR
Dallas Mitchell Ward Dec. 1, 1959  D. M. WARD  2,915,040
BIRDHOUSE FOR MARTINS
Filed Feb. 11, 1958  7 Sheets-Sheet 3
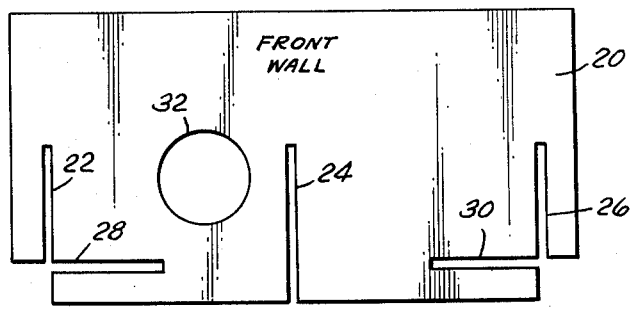
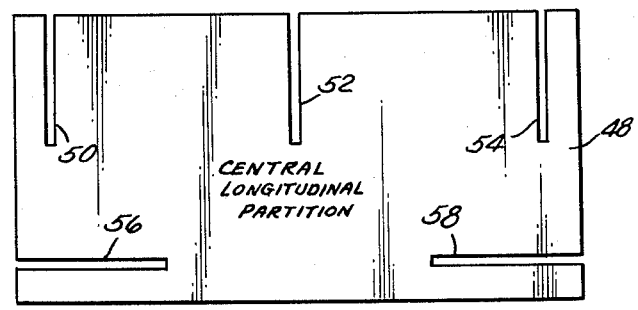
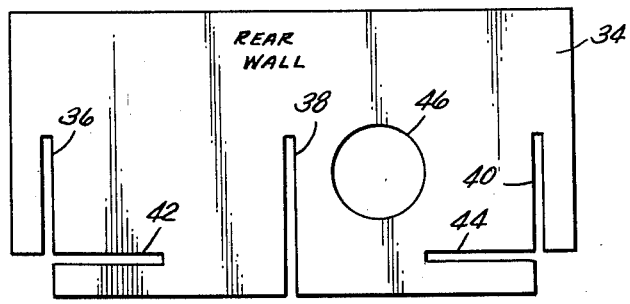
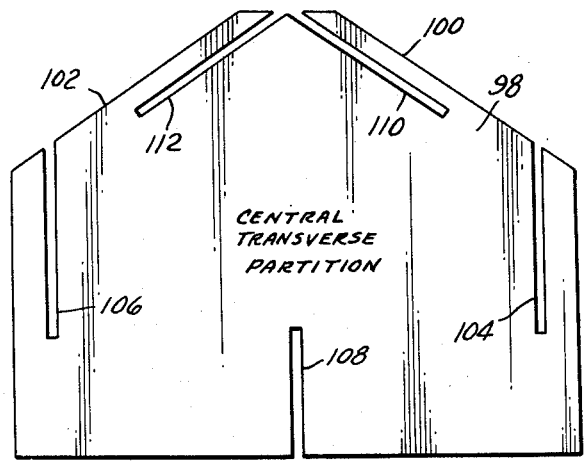
INVENTOR.
Dallas Mitchell Ward Dec. 1, 1959  D. M. WARD  2,915,040
BIRDHOUSE FOR MARTINS
Filed Feb. 11, 1958  7 Sheets-Sheet 4
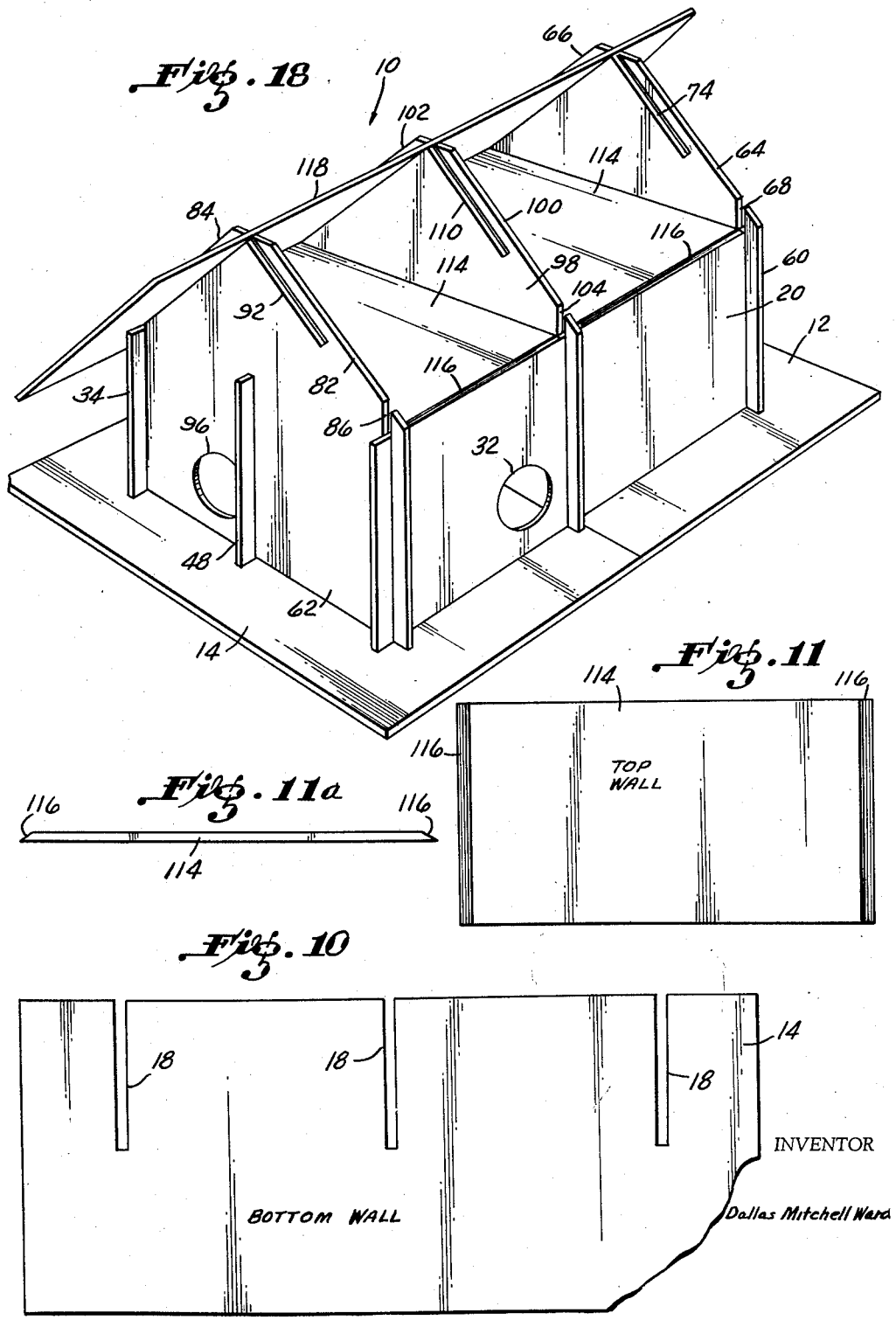

Dec. 1, 1959  D. M. WARD  2,915,040
BIRDHOUSE FOR MARTINS
Filed Feb. 11, 1958  7 Sheets-Sheet 5

INVENTOR
Dallas Mitchell Ward

Dec. 1, 1959  D. M. WARD  2,915,040
BIRDHOUSE FOR MARTINS
Filed Feb. 11, 1958  7 Sheets-Sheet 6
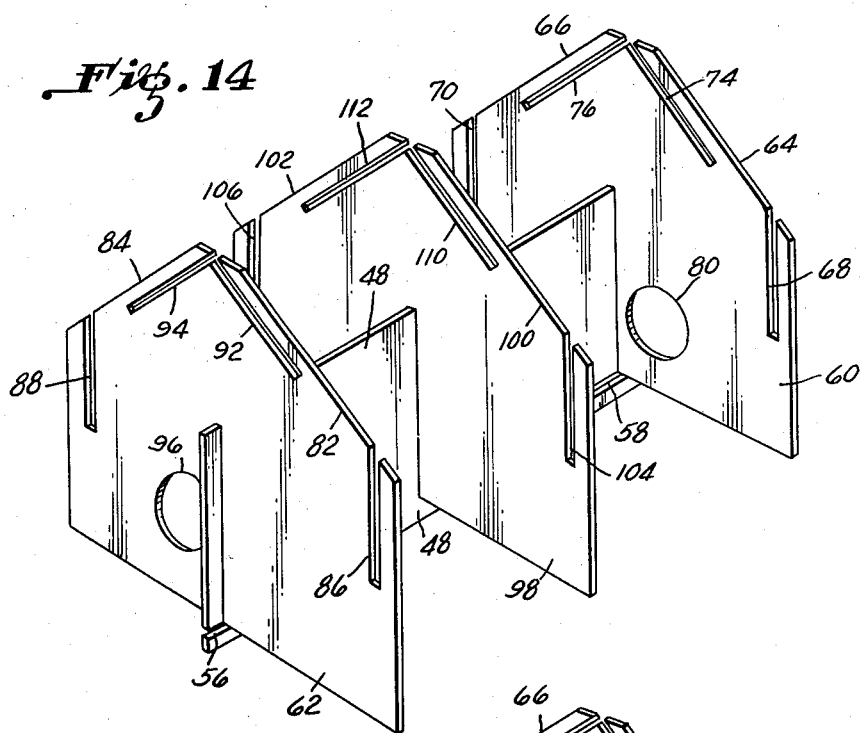
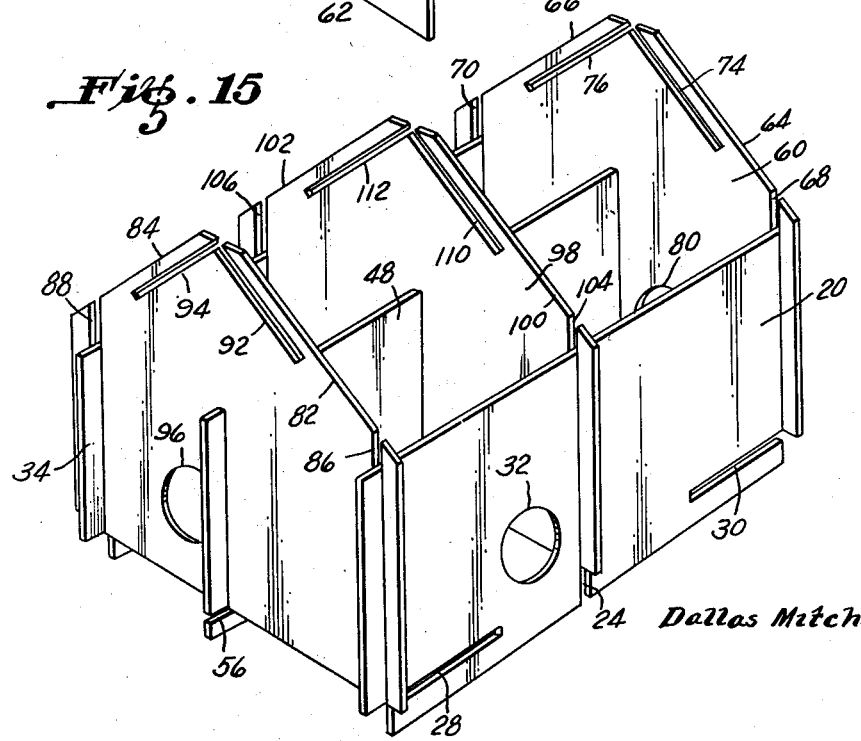
INVENTOR
Dallas Mitchell Ward Dec. 1, 1959   D. M. WARD   2,915,040
BIRDHOUSE FOR MARTINS
Filed Feb. 11, 1958   7 Sheets-Sheet 7
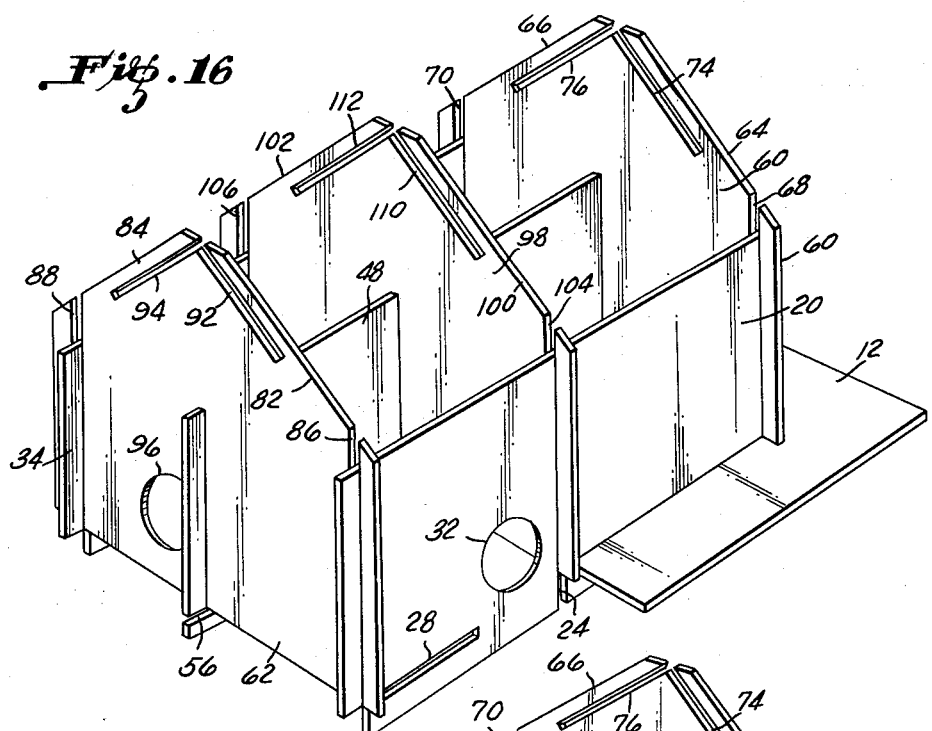
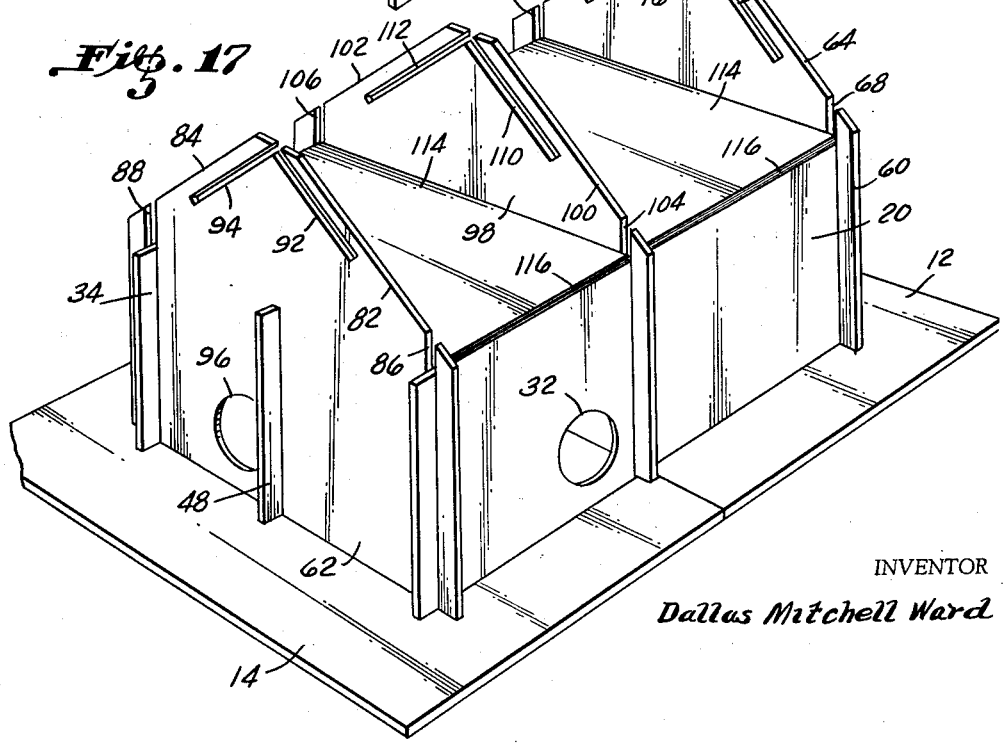
INVENTOR
Dallas Mitchell Ward United States Patent Office 2,915,040
Patented Dec. 1, 1959

2,915,040

BIRDHOUSE FOR MARTINS

Dallas Mitchell Ward, New Orleans, La.

Application February 11, 1958, Serial No. 714,514

5 Claims. (Cl. 119—23)

The present invention relates to a multi-compartment birdhouse. More particularly the present invention relates to a knockdown, multi-compartment birdhouse that is designed for use by a particular species of bird and that is readily assembled without the aid or need of special fastening elements or tools.

It is known and understood that various species of birds have particular nesting habits, and in order to attract such birds to man-made birdhouses, the birdhouse must be constructed so as to conform as nearly as possible to these nesting habits.

The birdhouse embodied in the present invention is designed to be inhabited by a species of the swallow family known as the purple martin. The purple martin, genus progne, species subis, is found principally in the southern areas and research in the nesting habits of this type of swallow and other swallows has revealed that each species does have somewhat different nesting habits and therefore requires a particular type of house for proper nesting. The purple martin like most of the species of the swallow family, will not nest alone, preferring to nest in groups. Yet the purple martin will only nest in a separate compartment. Because of physical characteristics, the purple martin also requires a certain amount of space for each compartment for proper nesting.

Prior to the instant invention, various forms of multi-compartment birdhouses have been known, but generally these heretofore known birdhouses were not constructed so as to provide uniform compartments, nor were these prior known birdhouses adapted to be readily assembled or disassembled so as to properly clean the compartments between nesting seasons. Although purple martins nest in groups, they generally prefer separate entranceways to their compartments and the heretofore known birdhouses not only did not provide for private approaches to the compartments, but generally included three or more entranceways at a single approach.

It is therefore an object of the present invention to provide a multi-compartment birdhouse that is readily assembled and disassembled without the aid of special fastenings or tools.

Another object of the present invention is to provide a multi-compartment birdhouse that includes a plurality of compartments of predetermined size.

Still another object of the present invention is to provide a multi-compartment birdhouse that includes a separate approach for each compartment.

Still another object is to provide a multi-compartment birdhouse which comprises a plurality of panels that are formed with spaced slots thereby enabling the panels to be interfitted for the assembly and disassembly of the unit without the art of special fastenings or tools.

Still another object is to provide a multi-compartment birdhouse, the size of each compartment being uniform and conforming to the nesting habits of the purple martin.

With the foregoing and other objects in view, the invention will be more fully described hereinafter, and will be more particularly pointed out in the claims appended hereto.

In the drawings, wherein like symbols refer to like or corresponding parts throughout the several views:

Figure 3 is an elevational view of one of the side walls showing the interfitting slots and a compartment opening or entranceway.

Figure 3a is an end view of the side wall shown in Figure 3.

Figure 4 is a view in elevation similar to Figure 3, showing another side wall.

Figure 5 is a plan view of one of the bottom walls.

Figure 6 is an elevational view of the front wall.

Figure 7 is a view in elevation similar to Figure 6 of a central longitudinal partition.

Figure 8 is an elevational view similar to Figures 6 and 7 of the rear wall.

Figure 9 is an elevational view of a central transverse partition showing the inclined upper edges for receiving the roof sections.

Figure 10 is a plan view of the other bottom wall.

Figure 11 is a plan view of one of the compartment top walls.

Figure 11a is an edge view of the top wall illustrated in Figure 11.

Figure 14 illustrates the next step wherein the other side wall is interfitted with the central longitudinal partition.

Figure 15 shows the assembly after the front and rear walls have been interfitted with the side walls and the central transverse partition.

Figure 16 shows one of the bottom walls after it has been interfitted in the assembled position.

Figure 17 illustrates the assembly of the other bottom wall and the compartment top walls.

Figure 18 illustrates the assembly after one of the roof panels is interfitted in position.

Figure 1:
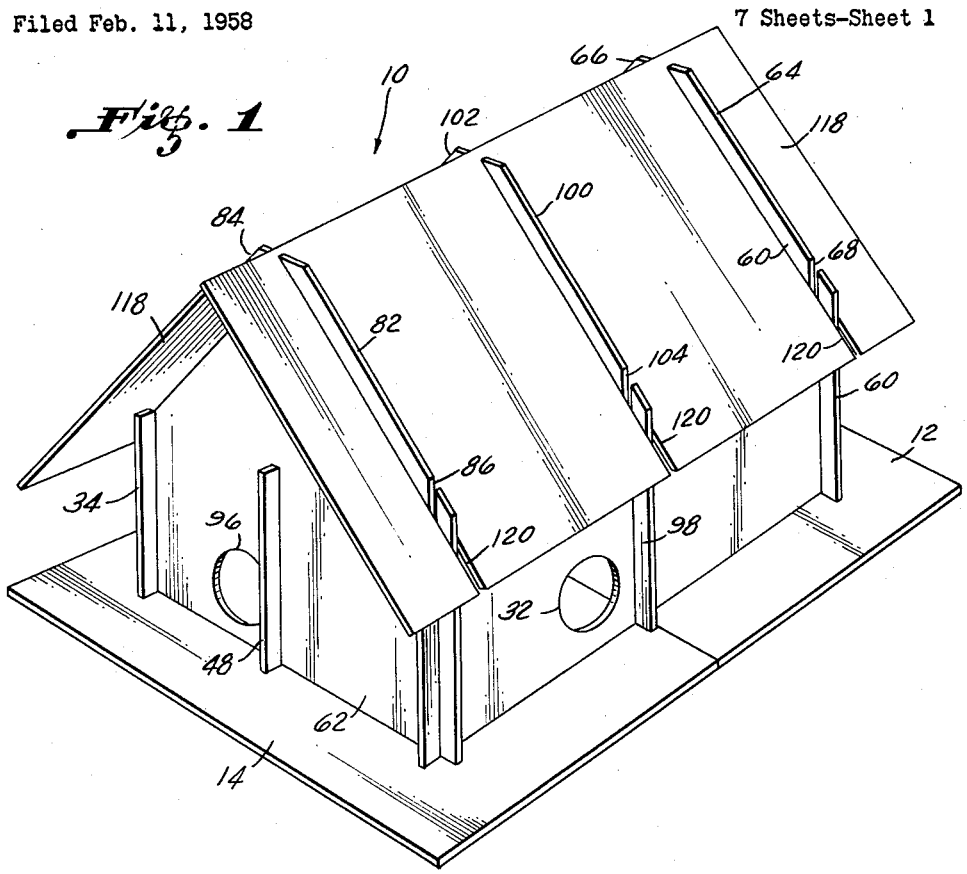
Figure 1 is a perspective view of the completely assembled birdhouse embodied in the present invention, two of the isolated compartment openings or entranceways being shown.

Referring to the drawings and particularly to Figure 1, the multi-compartment birdhouse embodied in the present invention is shown in the assembled position and is generally indicated at 10. The birdhouse 10 is formed of a plurality of flat panels that may be of a wood, metal, plastic or composition material, whichever is more convenient or economical to use. Each of the panels that comprise the birdhouse have spaced slots formed therein, the slots being located in predetermined position in each of the panels so as to enable the panels to be interfitted together without the aid of any special fastening elements or tools.

Referring now to Figures 16–18 the birdhouse is shown in partial assembly therein, and since the panels comprising the complete unit are more easily seen and the function thereof understood as viewed in these figures, they will be referred to in the first instance for purposes of clarity.

The base of the birdhouse includes a pair of bottom walls 12 and 14, that define the bottom of the nesting compartments and also extend outwardly beyond the compartment walls to form porch areas. As shown in Figure 5 the bottom wall 12 has three slots 16 formed therein in spaced relation, the slots 16 extending from the inner longitudinal edge to a point slightly less than one-half the lateral dimension of the bottom wall 12. Referring to Figure 10, the second bottom wall 14 is illustrated therein and is also formed with spaced slots 18 that extend laterally from the inner edge of the bottom wall to a point slightly less than one-half the lateral dimension theereof.

The slots 18 formed in the botom wall 14 are slightly longer than the slots 16 formed in the bottom wall 12 and this construction enables the bottom walls to be assembled in edge-to-edge relation as will be described hereinafter.

Interfitted in one side of the bottom walls 12, 14 is a front wall 20 which defines the front of the birdhouse 10. As shown in Figure 6, the front wall 20 includes vertically extending spaced slots 22, 24 and 26 and horizontally extending slots 28, 30. The slots 28, 30 communicate with the slots 22, 26 respectively, the intersection of these slots being exposed by cutting off a portion of the adjacent corner of the front wall 20. Also formed in the front wall 20 between the slots 22, 24 is a circular opening 32 which defines an entranceway to one of the nesting compartments.

As shown in Figures 16 and 17 one of the end slots 16 of the bottom wall 12 interfits with the horizontal slot 30 of the front wall 20, while one of the end slots 18 of the bottom wall 14 interfits with the horizontal slot 28 of the front wall.

Since the slots 18 are slightly longer than the slots 20, the bottom wall 14 extends beyond the transverse center line of the birdhouse and makes edge-to-edge contact with the bottom wall 12 and thereby provides a supporting surface for a central transverse partition indicated at 98 and to be described hereinafter.

Interfitted in the other side of the bottom walls 12, 14 is a rear wall 34 which, as shown in Figure 8, is similar in construction to the front wall 20 and includes spaced vertically extending slots 36, 38 and 40 and horizontally extending slots 42 and 44, the junction of the slots 36, 40 with the slots 42, 44 respectively being exposed by cutout corner portions. Formed in the rear wall 34 between the vertical slots 36 and 40 is a second circular opening 46 that defines the entranceway to a second nesting compartment. As indicated in Figures 16 and 17 the appropriate outer slots 16 and 18 of the bottom walls 12 and 14 respectively are interfitted in the horizontal slots 44 and 42 to position the rear wall 34 in spaced parallel relation with respect to the front wall 20.

Spaced intermediate the front wall 20 and rear wall 34 and extending parallel therewith is a central longitudinal partition 48. As shown in Figure 7, the central partition 48 is formed with spaced vertically extending slots 50, 52 and 54, the open sides of which are located along the upper edge thereof, and which extend somewhat less than one-half the vertical dimension of the central partition. Also formed in the central partition 48 are horizontally extending slots 56 and 58, which are spaced from the lower edge of the central partition 48 and the open edge of which is exposed along the side edges of the central partition.

As shown in Figure 14 the central longitudinal partition 48 is adapted to be interfitted in the side walls 60, 62 and in a central transverse partition 98 that is located intermediate the side walls 60, 62 and extends parallel therewith. Referring to Figure 3, side wall 60 is illustrated and as shown is formed with an upper truncated portion that is defined by inclined upper edges 64, 66. Extending downwardly from the inclined edge 64 is an end slot 68 that is adapted to be interfitted with the slot 22 of the front wall 20 (see Figures 16 and 17), and similarly extending downwardly from the inclined edge 66 is an end slot 70 that is adapted to be interfitted in the slot 40 of the rear wall 34. Extending upwardly from the bottom edge of the side wall 60 and disposed centrally thereof is a center slot 72 that is adapted to be interfitted in the slot 54 formed in the central longitudinal partition 48. Formed in the upper portion of the side wall 60 and located in parallel relation with respect to the inclined edges 64, 66 respectively are inclined slots 74 and 76, the inclined slots 74, 76 terminating at a short horizontal edge 78 of the truncated portion and communicating with each other at that point. A circular opening 80 is formed in the side wall 60 between the slot 72 and the front edge of the side wall 60 and defines an entranceway to a third nesting compartment.

Referring now to Figure 4 the other side wall 62 is illustrated and is formed similarly to side wall 60, including inclined edges 82, 84, end slots 86, 88 extending downwardly from the inclined edges 82, 84 respectively, center slot 90, upper inclined slots 92, 94 and circular opening 96 which defines the entranceway to the fourth nesting compartment. As shown in Figure 15, the end slots 86 and 88 interfit with the end slot 22 of the front wall 20 and the end slot 36 of the rear wall 34 respectively, while the center slot 90 interfits with the center slot 52 of the central longitudinal partition 48.

The nesting compartments which define the birdhouse 10 are of substantially equal dimension and a central transverse partition 98 cooperates with the central longitudinal partition 48 to sub-divide the area defined by the front and rear walls 20, 34 and side walls 60, 62 into four symmetrical units or nesting compartments. As shown in Figure 9, the central transverse partition 98 is formed substantially similar to the side walls 60, 62 and includes a truncated upper portion defined by inclined upper edges 100, 102, end slots 104, 106 extending downwardly from edges 100, 102 respectively, center slot 108 and upper inclined slots 110, 112. Referring to Figure 16, the central transverse partition 98 is shown in the assembled position wherein end slot 104 interfits with the end slot 24 of the front wall 20, end slot 106 interfits with end slot 38 of the rear wall 34 and central slot 108 interfits with center slot 52 of the central longitudinal partition 48. It is seen that the bottom edge of the central transverse partition rests flush on the upper surface of the bottom wall 14 which extends slightly beyond the transverse center line of the birdhouse. It is understood, of course, that the partitions 48 and 98 are not formed with any openings or entranceways since they define the inner walls of the nesting compartments.

Figure 2:
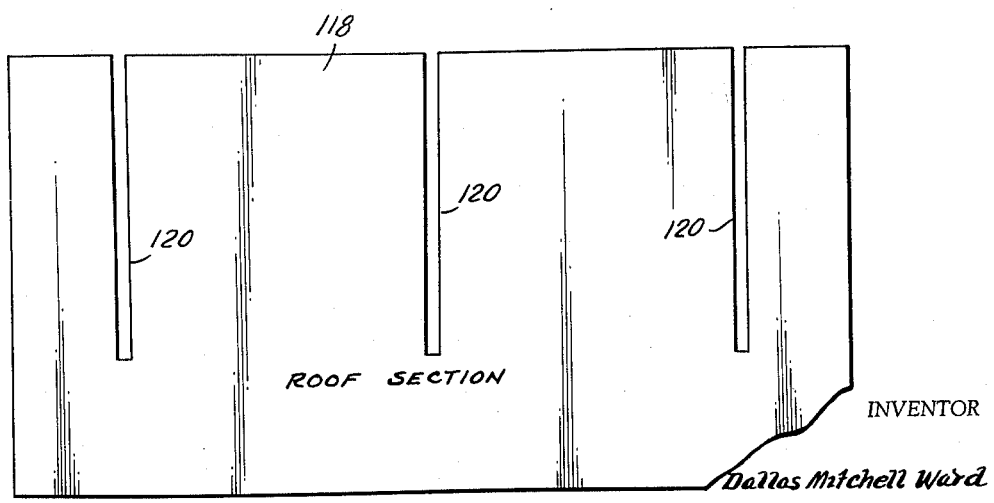
Figure 2 is a plan view of one of the roof sections, the formation of the interfitting slots being illustrated therein.

The compartment units are completed by overlaying a top wall 114 over the upper edges of the front and rear walls and the central longitudinal partition, the side edges of the top walls 114 engaging the inner surfaces of the side walls 60, 62 and the central transverse partition 98. Referring to Figures 11 and 11a, one of the top walls 114 is illustrated and as shown is substantially rectangular in configuration and includes inclined or bevelled outer edges 116, the pitch of which is parallel to the inclined edges of the side walls 60, 62 and the central transverse member 98. By forming the edges of the top walls 114 in this manner, roof sections 118 can be slidably placed in position and properly overhang the front and rear walls free of obstruction. As shown in Figure 2, each of the roof sections 118 is of sufficient dimension to adequately cover one-half of the exposed compartment walls and includes spaced slots 120. When slidably placing the roof sections 118 in position, the slots 120 interfit with the inclined slots 74 and 76 of the side wall 60, inclined slots 92 and 94 of the side wall 62 and inclined slots 110, 112 of the central transverse partition 98. The slots 120 in one of the roof sections 118 are formed slightly longer than the slots in the other roof section and this provides sufficient clearance above the upper edge of the longer slotted section to enable the section with the shorter slots to be received in the inclined slots formed in the central transverse partition 98 and the side walls 60, 62. When the roof sections are properly assembled the second section thus protrudes slightly over the first section. Referring again to Figure 1, the completely assembled birdhouse 10 is illustrated therein and as described herein above, comprises a unit that is composed of the interfitting panels that are secured and retained in place without the aid of any special fastening elements or tools.

The assembly operation

Referring now to Figures 12-18 the assembly of the individual panels will be described, it being understood that the method of assembly comprises the steps of interfitting the panels together by means of their complementary slots.

Figure 12:
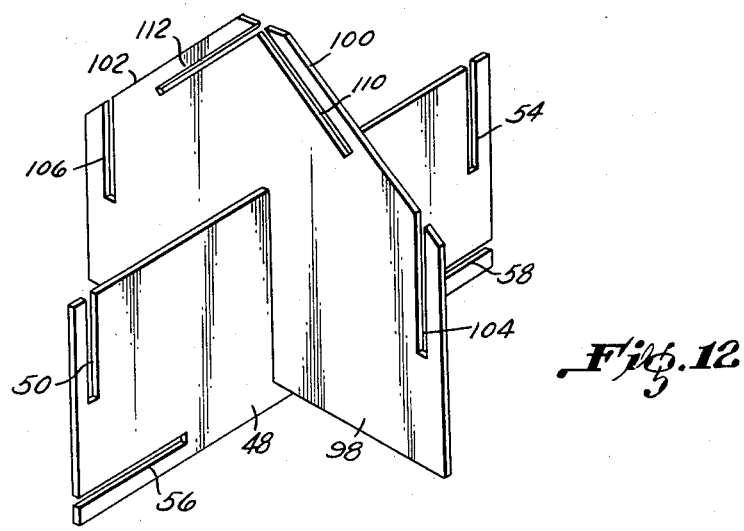
Figure 12 illustrates the first step in the assembly operation wherein the central transverse partition is interfitted with the central longitudinal partition.
Figure 13:
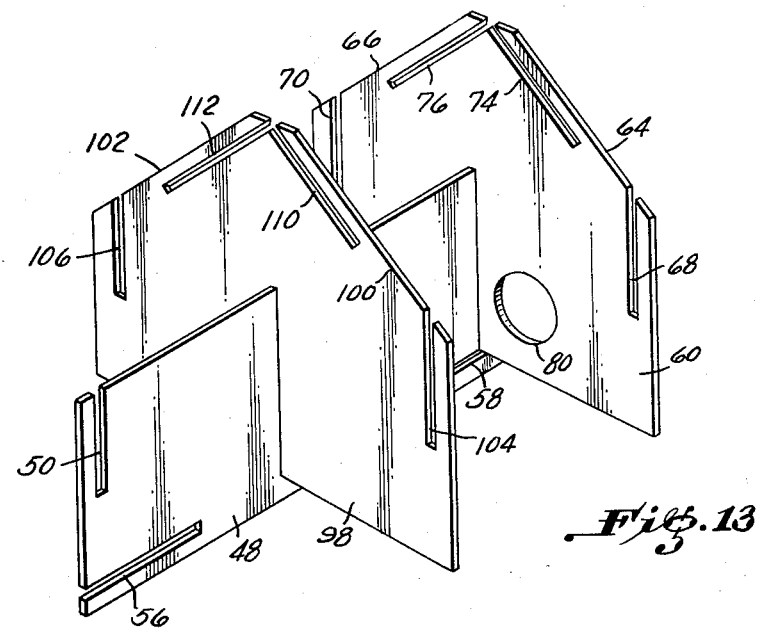
Figure 13 illustrates the next step in the assembly operation wherein a side wall is interfitted with the central longitudinal partition.

Referring particularly to Figure 12, the first step in the assembly of the birdhouse is the securing together of the central transverse partition 98 with the central longitudinal partition 48, the center slot 108 being interfitted with the center slot 52. As shown in Figure 13, the side wall 60 is then joined to the central longitudinal partition 48 by interfitting the center slot 72 with the end slot 54. The other side wall 62 is next joined to the central longitudinal partition 48, the central slot 90 being interfitted with the end slot 50 as shown in Figure 14. It is understood, of course, that either side wall 60, 62 may be first interfitted in the central longitudinal partition 48 and that the drawings merely show a suggested procedure.

Referring now to Figure 15, the assembly operation is continued by joining the front wall 20 and rear wall 34 to the side walls 60, 62 and central transverse partition 98, the individual nesting compartments thereby being defined. In this assembly step the front wall 20 is joined to the assembly by interfitting the end slot 22 with the end slot 86, the center slot 24 with the end slot 104 and the end slot 26 with the end slot 68. The rear wall 48 is similarly joined to the assembly by interfitting the end slot 36 with the end slot 88, the center slot 38 with the end slot 106 and the end slot 40 with the end slot 70. It is seen from Figure 15 that each of the individual nesting compartments defined by the now assembled panels is substantially the same size and that each of the openings or entranceways to the compartments are located at a separate approach. Thus no two compartment entranceways are located on the same side of the birdhouse.

Referring now to Figure 16, the assembly operation is continued by joining the bottom wall 12 to the front wall 20, rear wall 34 and central longitudinal panel 48. This step is accomplished by interfitting the slots 16 with the horizontal slots 30, 44 and 58. The bottom wall 12 is assembled in a similar manner as shown in Figure 17, the slots 18 being interfitted with the horizontal slots 28, 42 and 56.

The nesting compartments are completed by placing the top walls 114 over the upper edges of the front wall 20, rear wall 34 and central longitudinal partition 48, the bevelled edges 116 of the top walls facing upwardly so as to accommodate the roof sections 118. The assembly operation is then completed by placing the roof sections 118 in proper position, the slots 120 of one roof section interfitting with the inclined slots 92, 110 and 74 (Figure 18) and the slots 120 of the other roof section interfitting with the inclined slots 94, 112 and 76 (Figure 1).

As shown in Figure 1, when the roof sections are properly assembled, the surfaces thereof are inclined so that the upper edges make contact at the longitudinal center line of the birdhouse and the lower edges thereof overhang a predominant portion of the porch area that is defined by the extensions of the bottom walls 12, 14. The roof sections 118 are also formed of sufficient length to extend outwardly beyond the side walls 60, 62 thereby affording a protective covering for the porch areas adjacent these walls.

The completely assembled birdhouse may be placed in any proper location for convenient access by the birds which will use it for nesting and may be either placed on an elevated structure which includes a planar surface or may be fixed atop a vertical standard or pole.

It is seen that the multi-compartment bird-house embodied in the present invention is a radical departure from those known heretofore and includes a plurality of equi-size compartments that are formed by the birdhouse panels that are assembled without the aid of any special tools or fastenings. Each of the compartment openings or entranceways are located remote from the others thereby affording a private entrance for each compartment. The birdhouse may be quickly and easily disassembled without breakage of the panels and can be cleaned and stored for the next nesting season. The panels which may be formed of any weather resistant material can be stored or shipped in a compact unit and may be even assembled by those not normally skilled in the use of tools.

Although I have disclosed herein the best form of the invention known to me at this time, I reserve the right to all such modifications and changes as may come within the scope of the following claims.

What is claimed is:

1. In a knockdown multi-compartment birdhouse, a plurality of interfitting panels forming a one-story unit, each of said panels being formed with a plurality of slots adjacent their interfitting edges, all of said panels having at least one centrally positioned slot formed therein, at least one of said panels constituting a central longitudinal partition; said panels including spaced side walls interfitted in said longitudinal partition, a central transverse partition interfitting with said longitudinal partition and located intermediate said side walls, said side walls and transverse partition defining roof supporting members, spaced front and rear walls interfitting with said spaced side walls and said longitudinal partition and located parallel to said longitudinal partition, and a pair of floor members interfitting with said front and rear walls and said longitudinal partition; a four-sided construction defined by said interfitting panels and forming four equi-size individual compartments that are defined between said front, rear and side walls and said longitudinal and transverse partitions, said front and rear walls and side walls each having an opening formed therein, each of said openings communicating with a different compartment and providing access thereto so that only one opening is formed on each side of said four-sided construction, and roof members interfitting with said side walls and said transverse partition, all of said panels being slidably removable from their interfitted positions for ready disassembly of said birdhouse.

2. In a knockdown multi-compartment birdhouse, a plurality of interfitting panels having slots formed therein adjacent their interfitting edges, each of said panels having at least one centrally positioned slot formed therein, at least one of said panels constituting a central longitudinal partition; said panels including side walls interfitted in said central longitudinal partition, a central transverse partition slidably interfitting with said longitudinal partition and located perpendicular thereto, front and rear walls slidably interfitting with said side walls and transverse partition and located parallel to said longitudinal partition, bottom walls slidably interfitting with said front and rear walls and said longitudinal partition, and roof members slidably interfitting with said side walls and said transverse partition; all of said panels being slidably removable from their interfitted position for ready disassembly of said birdhouse.

3. A multi-compartment birdhouse comprising a plurality of panels, said panels including spaced side walls, spaced front and rear walls, a longitudinal partition spaced from said front and rear walls, a transverse partition spaced from said side walls, bottom walls and roof members, each of said panels having spaced slots formed therein and inclding a centrally formed slot, said panels being joined together in interfitting relation through the co-action of said slots and being retained in position solely through the interfitting relation thereof, said panels defining a four-sided construction having equi-size compartments formed therebetween, each of said compartments having an entranceway providing for access thereto, and each of said entranceways located remote from the others and in one of said sides, thereby providing for a private approach to each of said compartments.

4. A multi-compartment birdhouse comprising a plurality of panels, each of said panels having spaced end slots formed therein adjacent the edges thereof and a center slot formed centrally thereof and intermediate said end slots, said panels being joined together in interfitting relation through the coaction of said slots, the assembled birdhouse being retained in position solely through the medium of said interfitting panels, said panels including side walls and a transverse partition disposed in parallel relation to said side walls, front and rear walls interfitting with said side walls and transverse partition, a longitudinal partition spaced intermediate said front and rear walls and located in parallel relation with respect thereto, the slots of said longitudinal partition interfitting with the center slot of said side walls and transverse partition, a pair of bottom walls interfitting with said front and rear walls and said longitudinal partition to form the floor of said birdhouse, and roof members interfitting with said side walls and transverse partition and disposed in an inclined position.

5. A multi-compartment birdhouse as set forth in claim 3, said panels defining a one story construction having four sides, said four-sided construction being formed with equi-size compartments, each of said compartments having a front entranceway providing for access thereto, and each of said entranceways being located remote from the other entranceways and in one of said sides, whereby a private approach to each of said compartments is provided.

References Cited in the file of this patent
UNITED STATES PATENTS

| | | |
|---|---|---|
| 1,358,119 | Shrock | Nov. 9, 1920 |
| 2,092,155 | Hackett | Sept. 7, 1937 |